May 4, 1954 W. KOHLHAGEN 2,677,776
SYNCHRONOUS MOTOR OF THE SELF-STARTING TYPE
Filed May 28, 1952

Inventor:
Walter Kohlhagen
by Stewart & Sprungel
Attorneys.

Patented May 4, 1954

2,677,776

UNITED STATES PATENT OFFICE 2,677,776

SYNCHRONOUS MOTOR OF THE SELF-STARTING TYPE

Walter Kohlhagen, Elgin, Ill., assignor to The E. Ingraham Company, Bristol, Conn., a corporation of Connecticut Application May 28, 1952, Serial No. 290,460

15 Claims. (Cl. 310—156)

This invention relates to single-phase synchronous motors of the self-starting type.

The motor with which the present invention is concerned is of the characteristic kind having a multi-polar field of which alternate poles are of opposite sign or polarity at any given instant and change their polarities in phase with an alternating current when the latter is supplied to the associated field coil, and a permanently magnetized rotor the poles of which cooperate with the field poles in driving the rotor in synchronism with the alternation of the current. To render this kind of motor self-starting, recourse is usually had to the well-known expediency of providing shaded poles among the field poles of a motor. However, this expediency is costly and also requires additional material and space in relatively small motors, such as used for operating clock mechanisms or other timing devices, for instance.

Accordingly, it is an object of the present invention to provide a motor of this kind which is assuredly self-starting without the use of shaded field poles, so that its operating speed is kept relatively low and its developed torque relatively high.

Another object of the present invention is to provide a motor of this kind in which the field poles and rotor poles are so coordinated that the rotor will, on deenergization of the field coil, inevitably seek and assume an idle position of minimum reluctance in which the same is sufficiently spaced from any one of its running positions of minimum reluctance to assure an immediate start and continued running of the rotor and, hence, of the motor, when the field coil is reenergized with alternating current of even widely varying voltage.

It is a further object of the present invention to provide motors of this kind in which there may be some latitude in the aforementioned coordination of the field poles and rotor poles so that these motors will assuredly be self-starting when using rotors which are simply blanked from sheet stock and not further shaped or sized in any way.

A further object of the present invention is to provide a self-starting motor of this kind which is exceedingly simple and rugged in its construction, yet highly reliable in its performance over a long period of continuous use, and which readily lends itself to efficient mass production at low cost.

Other objects and advantages will appear to those skilled in the art from the following, considered in conjunction with the accompanying drawings.

In the accompanying drawings forming part of the present disclosure, in which certain modes of carrying out the invention are shown for illustrative purposes:

Figures 1, 2:
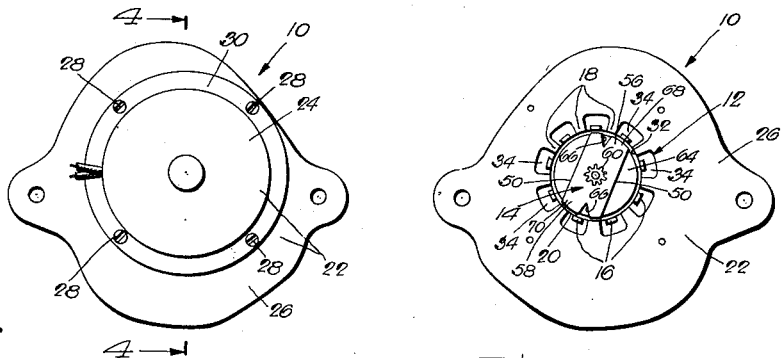
Fig. 1 is a top view of a motor embodying the present invention.
Fig. 2 is a bottom view of the motor.

Referring to the drawings, and more particularly to Figs. 1 to 5 thereof, the reference numeral 10 designates an electric motor having a field structure 12 and an armature or rotor 14. The field structure 12 comprises two sets of field poles 16 and 18 which are provided on separate field casing sections 20 and 22, respectively. The casing section 20 comprises a disc having forwardly projecting fingers which are in this instance equi-angularly spaced and constitute the field poles 16. The casing section 22 comprises a cup-shaped member 24 and a plate member 26 secured by screws 28, for instance, to a flange 30 on the cup-shaped member 24. The plate member 26 is died out (Figs. 2, 6 and 7) to provide a circular opening 32 for the rotor 14, and a plurality of equi-angularly spaced tooth-like formations which constitute the field poles 18 and are separated from each other by gaps 34, respectively. The field poles 16 are of the same widths. The other field poles 18 are also of the same widths, though not necessarily the same widths as the field poles 16. However, the field poles 16 and 18 are, in the present instance of identical widths or substantially identical widths.

Figures 6, 7, 8, 9:
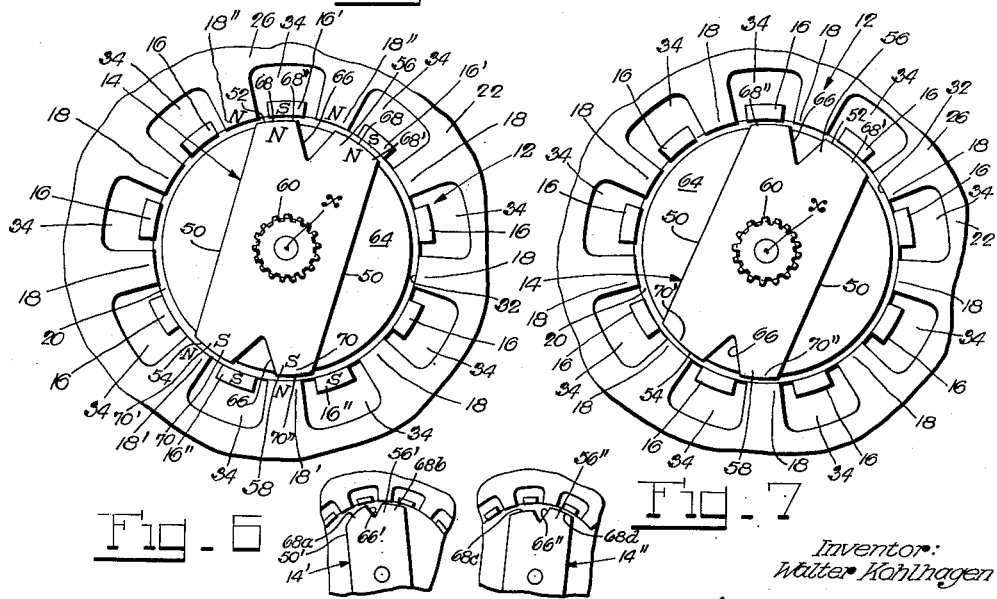
Figs. 6 and 7 are enlarged fragmentary bottom views of the motor showing the polar arrangement thereof in different operating conditions of the motor.
Fig. 8 is a fragmentary bottom view of a motor embodying the present invention in a modified manner.
Fig. 9 is a fragmentary bottom view of a motor embodying the present invention in a further modified manner.

The casing sections 22 and 24 are suitably secured, in this instance, by riveting as at 36 and 38, respectively, to the opposite ends of a post or core 40 (Fig. 4), so that the field poles 16 and 18 are arranged in alternate order and in substantial circumferential alignment with each other in the fashion shown in Figs. 6 and 7. More particularly, the field poles 16 project into the gaps 34 between successive field poles 18 and are equally spaced therefrom.

Figures 3, 4:
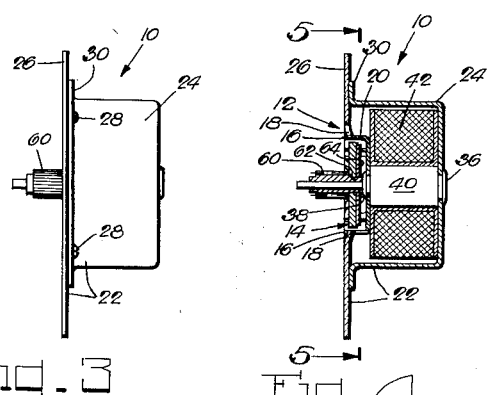
Fig. 3 is a side view of the motor.
Fig. 4 is a cross-section through the motor as taken on the line 4—4 of Fig. 1.
Figure 5:
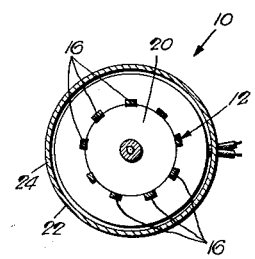
Fig. 5 is a section taken on the line 5—5 of Fig. 4.

As shown in Fig. 4, a field coil 42 is placed around the post 40 and between the casing sections 20 and 22. Single phase alternating current may be supplied to this coil from any suitable source. The casing sections 22 and 24 are made of any suitable non-permanent magnetic material. Since the radial portions of the casing sections 20 and 22 are located on opposite sides of the field coil 42, these casing sections are, during energization of the field coil, magnetized at any given instant in such a way that they are of opposite polarity. Accordingly, the alternate field poles 16 and 18 are of opposite polarity at any given instant, and their polarity changes in phase with the alternating current supplied to the field coil 42.

Referring now to the armature or rotor 14, the same is in the form of an elongated plate having substantially parallel straight side edges 50 and opposite end edges 52 and 54 which extend concentrically with respect to the rotary axis $x$ of the rotor (Figs. 6 and 7). The rotor 14 is a permanent magnet having the opposite poles 56 and 58.

Suitably mounted on a forwardly projecting shank of the post 40 is a pinion 60 for the driving connection of the instant motor with a clock mechanism or any other timing device. In the present instance, the rotor 14 is suitably mounted on a hub portion 62 of the pinion 60 (Fig. 4). Preferably secured to the rotor 14 is a disc 64 of non-magnetic material, which serves as a flywheel to prevent surging of the rotor and instead compel it to turn uniformly when the field coil is energized.

In accordance with the present invention, the poles 56 and 58 of the rotor 14 are notched at 66 to divide them into pairs of spaced pole-faces 68 and 70, respectively. The notches 66 in the rotor poles 56 and 58 are preferably V-shaped, and are substantially of the same width as any one of the field poles 16 or 18. The notches 66 in the rotor poles 56 and 58, while arranged diametrically opposite each other, are in this form of the invention offset from the respective centers of these rotor poles. Thus, the diagonally opposite pole-faces 68' and 70' of the respective rotor poles 56 and 58 are wider than the diagonally opposite pole faces 68'' and 70'' thereof (Figs. 6 and 7). For reasons which will appear obvious hereinafter, the width of each of the rotor poles 56 and 58 must exceed the overall spacing of three consecutive field poles 16, 18 as shown. Furthermore, each of the pole faces 68'' and 70'' of smaller width must be of a width in excess of that of any field pole 16 or 18.

As usual, the rotor 14 will, on deenergization of the field coil 42 and just before coming to rest, seek and assume the nearest one of a number of angularly spaced idle or starting positions of minimum reluctance in each of which its pole faces 68 and 70 are adjacent the greatest possible mass of field pole material. Due to the described widths of the rotor poles 56 and 58, and the off-center location of the notches 66 in the rotor poles 56 and 58 and resulting different widths of the divided pole faces 68 and 70 thereat, the rotor 14 will always come to rest in any one of a number of starting positions in which its notches 66 will inevitably be out of alignment with the adjacent field poles 16 and 18. Thus, Fig. 6 shows the rotor 14 in one of its possible starting positions in which the notches 66 are clearly out of alignment with the adjacent field poles 16 and 18 and the pole faces 68 and 70 are in toto substantially adjacent a maximum possible mass of field pole material. In this connection, it will be appreciated that it is only by virtue of the beforementioned widthwise relation of the rotor poles 56, 58 and of the notches 66 therein and smaller-width pole faces 68'', 70'' thereof to each other and to the widths and spacing of the field poles, that the rotor poles may, in any idle position of minimum reluctance of the rotor, be adjacent a maximum mass of field pole material which involves portions of four consecutive field poles and permits the described disalignment of the notches 66 from the adjacent field poles in any idle rotor position. In distinct contrast to these idle or starting positions of the rotor 14, the latter will, when running on energization of the field coil 42, have successive running positions of minimum reluctance, i. e. positions in which maximum magnetic forces occur, in each of which positions the rotor notches 66 are in alignment with the oppositely polarized field poles 16 and 18 of a pair as shown in Fig. 7, and the presently aligned rotor pole faces and field poles do not set up opposing forces which may interfere with the continued running of the rotor on successive polarity reversals of the field poles. An inspection of the momentary running position of minimum reluctance of the rotor 14 as shown in Fig. 7 will further convince that the rotor would never come to rest in this position because quite evidently a mass of field pole material distinctly less than a maximum mass thereof then confronts the pole faces 68 and 70. It is thus obvious that the rotor 14 will in any one of its possible starting positions of minimum reluctance be inevitably spaced from any one of its momentary running positions of minimum reluctance, so that the rotor will, on each reenergization of the field coil 42, assuredly be drawn in either direction into the nearest running position of minimum reluctance and thus start its normal run in synchronism with the alternating current supplied to the field coil.

Since the present motor has an odd number of field coils 16 and 18, the pole faces 68 and 70 of the presently shaped permanent-magnet rotor 14 must be of opposite polarities, as will clearly appear from the following. Thus, assuming that the pole faces 68 and 70 of the rotor 14 are of north and south polarities, respectively, and that the rotor is in the idle position shown in Fig. 6, and assuming further that the field coil 42 be suddenly supplied with current and that the polarities of the field poles 16 and 18 be for the first time as indicated in Fig. 6, it then follows that the south field poles 16' and north field poles 18' will attract the adjacent pole faces 68 and 70, respectively, of the rotor, resulting in clockwise rotation of the latter from the starting position in Fig. 6 into the first momentary running position of minimum reluctance shown in Fig. 7. Supplementing the rotor-starting action of the south and north field poles 16' and 18' are the north and south field poles 18'' and 16'', respectively, which in the instant example will repel the adjacent north and south poles 68 and 70, respectively, of the rotor and further compel the latter to turn clockwise into the position shown in Fig. 7. Thus, with the initial polarities of the field poles 16 and 18 being as indicated in Fig. 6, the rotor 14 will start in clockwise direction. Contrariwise, if the initial polarities of the field poles 16 and 18 would, on reenergization of the field coil 42, be opposite to those indicated in Fig. 6, the rotor 14 would start in counterclockwise direction, as will be readily understood. Once started in either direction, however, the rotor 14 will continue to run in the same direction in phase with the alternating current and, accordingly, in phase with the reversals of the polarities of the field poles 16 and 18, as will be readily understood. Of course, if the motor would have an even number of field poles 16 and 18, diametrically opposite field poles would then be of the same polarities, in which case all pole faces of the present-type rotor would have the same polarities in order that the motor would be self-starting.

While the instant rotor 14 is shown provided with a notch 66 in each one of its poles, it is sufficient for self-starting purposes if only one pole of the rotor is notched. To develop maximum starting torque, however, it is preferable that both poles of the rotor be notched.

Due to the definite angular displacement of the rotor 14 in its starting position from any one of its momentary running positions of minimum reluctance, the starting torque is quite considerable and the instant motor will assuredly start with alternating current of even widely varying voltages. The instant motor, which is structurally exceedingly simple, is rendered self-starting by the simple expediency of shaping the rotor somewhat differently than a conventional rotor. While the coordination of the field poles and rotor poles must necessarily follow a predetermined pattern to achieve self-starting of motors of the instant kind, some latitude is permitted in the coordination of these poles so that these motors will assuredly be self-starting when using rotors which are simply blanked from sheet stock and not further shaped or sized in any way. Further, the instant motor, while exceedingly simple and rugged in construction, is nevertheless highly reliable in its performance over a long period of continuous use, and readily lends itself to efficient mass production at low cost.

Fig. 8 shows a modified form of the invention, according to which the notch 66' in the pole end 56' of the rotor 14' is located midway of the width of the pole end 56', but the pole face 68a, which in this modification is substantially of the same width as the adjacent pole face 68b, is in contrast to the latter gradually cut back toward the side edge 50' of the rotor, preferably in the curved fashion shown in Fig. 8. The effect of the cut-back pole face 68a is similar to that of the shorter-width pole faces 68'' and 70'' of the previously described rotor 14 (Fig. 7) insofar as the tendency of the rotor to seek a starting position different from any one of its momentary running positions of minimum reluctance is concerned, wherefore this modified motor is assuredly self-starting.

Fig. 9 shows another modified form of the invention, according to which the notch 66'' in the pole end 56'' of the rotor 14'' is, like in the preceding modification, located midway of the width of the pole end 56'', but the face 68c, which in this modification also is of substantially the same width as the adjacent pole face 68d, is in contrast to the latter evenly cut back, preferably in the curved fashion shown in Fig. 9. The effect of the cut-back pole face 68c is also similar to that of the shorter-width pole faces 68'' and 70'' of the previously described rotor 14 (Fig. 7) insofar as the tendency of the rotor to seek a starting position different from any one of its momentary running positions of minimum reluctance is concerned, wherefore this modified motor is also self-starting.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a self-starting alternating current motor, the combination of a field structure comprising a plurality of circularly arranged spaced field poles; means for magnetizing said field poles so as to produce opposite instantaneous polarities in alternate poles; and a permanent-magnet rotor having opposite poles of which at least one pole is of a width in excess of the overall distance of three consecutive field poles, said one rotor pole having a notch which is substantially equal in width to that of a field pole and divides said one rotor pole into spaced pole faces, said pole faces having different shapes and the cross-sectional areas of the gaps between said pole faces and the adjacent field poles, respectively, being different, so that said pole faces will cooperate with the adjacent demagnetized field poles in compelling the rotor into any one of a number of idle positions of minimum reluctance in which the same is spaced from any one of the momentary running positions of minimum reluctance of the rotor when driven.

2. In a self-starting alternating current motor, the combination of a field structure comprising a plurality of circularly arranged spaced field poles; means for magnetizing said field poles so as to produce opposite instantaneous polarities in alternate poles; and a permanent-magnet rotor having opposite poles of which at least one pole is of a width in excess of the overall distance of three consecutive field poles, said one rotor pole having a notch which is substantially equal in width to that of a field pole and divides said one pole into spaced pole faces, said pole faces having different shapes and the cross-sectional areas of the gaps between said pole faces and the adjacent field poles, respectively, being different, so that said pole faces will cooperate with the adjacent demagnetized field poles in compelling the rotor into any one of a number of idle positions of minimum reluctance in which said notch is out of alignment with any field pole.

3. In a self-starting alternating current motor, the combination of a field structure comprising a plurality of circularly arranged and substantially equi-angularly spaced field poles; means for magnetizing said field poles so as to produce opposite instantaneous polarities in alternate poles; and a permanent-magnet rotor having opposite poles of which at least one pole is of a width in excess of the overall distance of three consecutive field poles, said one pole having an off-center notch which is of a width substantially equal to that of a field pole and divides said one rotor pole into spaced pole faces of different widths so that the latter cooperate with the adjacent demagnetized field poles in compelling the rotor into any one of a number of idle positions of minimum reluctance in which the same is spaced from any one of the momentary running positions of minimum reluctance of the rotor when driven.

4. The combination in a self-starting alternating current motor as set forth in claim 3, in which the pole face of smaller width exceeds the width of a field pole.

5. In a self-starting alternating current motor, the combination of a field structure comprising two sets of field poles, said poles being circularly arranged in substantially equi-angularly spaced fashion so that the poles of said sets alternate with each other; means for magnetizing said field poles so as to produce opposite instantaneous polarities in alternate poles; and a permanent magnet rotor having diametrically opposite poles which are of the same widths, each in excess of the overall distance of three consecutive field poles, said rotor poles having diametrically opposite off-center notches, respectively, each of which is of a width substantially equal to that of a field pole and divides the respective rotor pole into spaced pole faces of different widths so that the latter cooperate with the adjacent demagnetized field poles in compelling the rotor into any one of a number of idle positions of minimum reluctance in which the same is spaced from any one of the momentary running positions of minimum reluctance of the rotor when driven.

6. In a self-starting alternating current motor, the combination of a field structure comprising a plurality of circularly arranged and substantially equi-angularly spaced field poles; means for magnetizing said field poles so as to produce opposite instantaneous polarities in alternate poles; and a permanent-magnet rotor having opposite poles of which at least one pole is of a width in excess of the overall distance of three consecutive field poles, said one pole having a central notch which is of a width substantially equal to that of a field pole and divides said one rotor pole into spaced pole faces of substantially equal widths, one of said pole faces being spaced farther from the adjacent field poles than the other pole face and cooperating with said field poles when demagnetized in compelling the rotor into any one of a number of idle positions of minimum reluctance in which the same is spaced from any one of the momentary running positions of minimum reluctance of the rotor when driven.

7. The combination in a self-starting alternating current motor as set forth in claim 6, in which said other pole face is uniformly spaced from the adjacent field poles, and said one pole face is inclined to the adjacent field poles.

8. The combination in a self-starting alternating current motor as set forth in claim 6, in which each pole face is uniformly spaced from the adjacent field poles, but said other pole face extends closer to the adjacent field poles than said one pole face.

9. A rotor for a self-starting alternating current motor having circularly arranged spaced field poles, comprising a permanent magnet having a rotary axis and opposite pole ends of which at least one pole end is concentric and of a width in excess of the overall distance of three consecutive field poles, said one pole end having an off-center notch which is of a width substantially equal to a field pole and divides said one pole end into spaced pole faces of different widths of which the pole face of smaller width exceeds the width of a field pole.

10. A rotor as set forth in claim 9, in which said notch is V-shaped.

11. A rotor for a self-starting alternating current motor having circularly arranged spaced field poles, comprising a permanent magnet having opposite side edges, a rotary axis substantially midway between said side edges, and diametrically opposite concentric pole ends of identical widths, each in excess of the overall distance of three consecutive field poles, said pole ends having diametrically opposite off-center notches each of which is of a width substantially equal to a field pole and divides the respective pole end into spaced pole faces of different widths of which the pole face of smaller width exceeds the width of a field pole.

12. A rotor as set forth in claim 11, in which said notches are identical V-shaped notches so that the diagonally opposite pole faces of the rotor are of the same widths.

13. A rotor for a self-starting alternating current motor having circularly arranged spaced field poles, comprising a permanent magnet having a rotary axis and opposite pole ends of which at least one pole end is of a width in excess of the overall distance of three consecutive field poles, said one pole end having a central notch which is of a width substantially equal to that of a field pole and divides said one pole end into spaced pole faces, and one of said pole faces is spaced farther from said rotor axis than the other pole face.

14. A rotor as set forth in claim 13, in which said one pole face extends concentrically, and said other pole face extends eccentrically, with respect to the rotor axis.

15. A rotor as set forth in claim 13, in which said pole faces extend concentrically with respect to the rotor axis.

References Cited in the file of this patent

UNITED STATES PATENTS

| Number | Name | Date |
|---|---|---|
| 2,492,197 | Schellens | Dec. 27, 1949 |
| 2,493,999 | Riley | Jan. 10, 1950 |
| 2,513,913 | Boyles | July 4, 1950 |